United States Patent [19]

Lewis

[11] 3,781,858
[45] Dec. 25, 1973

[54] FLUID LEVEL MONITORING SYSTEM

[75] Inventor: John R. Lewis, Framingham, Mass.

[73] Assignee: Harnessed Energies, Inc., Newton, Mass.

[22] Filed: Nov. 26, 1971

[21] Appl. No.: 202,353

[52] U.S. Cl............................ 340/244 A, 340/410
[51] Int. Cl. ......................................... G08b 21/00
[58] Field of Search.................. 340/214, 410, 411, 340/244 A; 200/84 C

[56] References Cited
UNITED STATES PATENTS
2,370,099  2/1945  Werder ....................... 340/410 UX
2,798,214  7/1957  Rowell ............................... 340/410

Primary Examiner—John W. Caldwell
Assistant Examiner—Daniel Myer
Attorney—Richard P. Crowley et al.

[57] ABSTRACT

A fluid level indicator wherein a float in a float chamber is responsive to the level of fluid in a vessel with which it communicates. The float carries a magnet which actuates a reed switch when the level of fluid in the float chamber reaches a predetermined level. A monitor connected to the reed switch indicates when the switch is actuated. A plunger disposed in the indicator when depressed moves the float, i.e., magnet, to actuate the reed switch regardless of the level of fluid in the float chamber whereby the monitoring system may be validated.

9 Claims, 4 Drawing Figures 3,781,858

FLUID LEVEL MONITORING SYSTEM

BACKGROUND OF THE INVENTION

In fluid level monitoring systems, a float is normally disposed within a float chamber having a magnet secured to the float. The float chamber is in communication with a vessel, the fluid level in the vessel corresponding to the fluid level in the float chamber. The system is designed such that when the float in the chamber reaches a predetermined level, then the magnet disposed on the float actuates a reed switch (or other magnetic switch) providing an indication that the float has reached the corresponding level. If the fluid in the vessel being monitored is agitated or sloshing, some arrangement for damping the fluid in the float chamber might be included to present an average fluid level to the switch.

U.S. Pat. Nos. 3,114,478 and 3,588,404 are broadly directed to fluid level monitoring systems wherein a magnet secured to a float actuates a reed switch when the float reaches a predetermined level. These references do not incorporate any specific damping structure to overcome agitation of the fluid in the float chamber. U.S. Pat. Nos. 2,810,036 and 3,471,664 are broadly the same as the two above-cited U.S. patents but include various structures which in part minimize the effects of agitation in the float chamber.

Of the present fluid level monitoring systems commonly available today, none employ any arrangement whereby the monitoring system, that is the switch, circuit, and indicator, can be actuated by the magnet associated with the float independently of the level of the fluid in the float chamber to determine if the monitoring system is functioning properly. Further, in connection with this, no system commonly available today provides an effective structure to eliminate turbulence in the float chamber and thus eliminate incorrect indications from the monitoring system when there is turbulence in the float chamber.

SUMMARY OF THE INVENTION

The invention is directed to a fluid level indicator and method of operating the same wherein the monitoring system of the fluid level indicator may be validated independently of the fluid level in either the float chamber or the vessel which communicates with the float chamber.

The invention in one embodiment is directed to a device whereby the position of the float in the chamber may be controlled independently of the level of the fluid in the chamber which independent control may be employed to validate the monitoring system.

Another aspect of the invention is the incorporation of a damping mechanism in the lower portion of the float chamber which structure prevents or inhibits agitation or vibration of the fluid in the float chamber.

The invention in a preferred embodiment is directed to a fluid level indicator wherein a plunger mechanism is adapted to reciprocate through the top of the housing of the fluid level indicator. The float element is positioned in the float chamber such that when the plunger is depressed, the float is depressed downwardly whereby the magnet associated with the float will actuate the switch. The switch then will actuate the circuit and the indicator associated therewith. The housing of the float level indicator has upper and lower ports, the lower port providing the direct fluid flow communication between the vessel and the float chamber and the upper port adapted to allow for venting between the vessel and the float chamber. The lower port is characterized by a vertical slit which serves two functions in that it controls or dampens the fluid flow between the float chamber and the fluid in the vessel and is structured such that there is little or no accumulation therein of foreign material, particles, and sludge, etc.

The invention is directed to a fluid level indicator wherein a float in a float chamber, which chamber is in communication with a fluid in a vessel is responsive to the level of fluid in the vessel, such that if the fluid in the vessel reaches a predetermined level, the float actuates a switch in the float chamber indicating that the level has been reached, and particularly the improvement thereof which comprises: means to control the position of the float in the float chamber independently of the level of the fluid in the chamber whereby the float may be positioned to actuate the switch to validate the monitoring system. My invention includes a method of validating a monitoring system in a fluid level indicator wherein a float in a float chamber is in communication with a vessel, the float responsive to the level of fluid in the vessel such that if the fluid in the vessel reaches a predetermined level, the float actuates a switch in the float chamber indicating that the level has been reached, the method which comprises: controlling the position of the float in the float chamber independently of the level of fluid in the float chamber whereby the float may be positioned to actuate the switch to validate the monitoring system.

DESCRIPTION OF THE PREFERRED EMBODIMENT(S)

Figure 1:
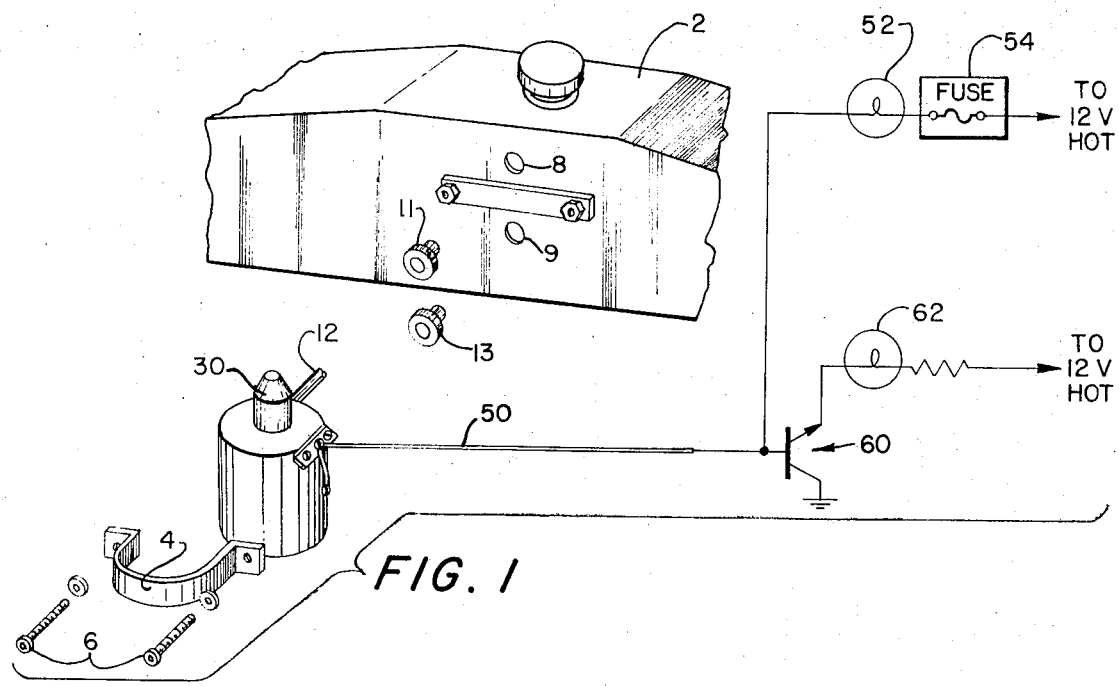
FIG. 1 is a perspective illustration of my invention employed to measure the liquid level in a closed pressurized system such as a radiator in combination with a schematic illustration of the wiring system.

Referring to FIG. 1, the telescopic perspective view shows the invention in combination with a closed pressurized fluid-containing system, such as a radiator 2. The fluid level indicator is secured to the radiator 2 by strap 4 through bolts 6 as shown; and as will become more apparent later in this particular embodiment, the center line of the bolts are substantially in line and generally parallel to the low level mark at which it is desired to indicate that the fluid in the radiator has reached its predetermined level where a warning signal is desired. To provide fluid flow communication between the indicator and the fluid level of the radiator which it is monitoring, upper and lower orifices 8 and 9 are provided in the radiator 2. As shown, step bushings 11 and 13 are adapted to be received by the orifices 8 and 9 and to receive the ports 12 and 14 (FIG. 2) of the indicator to indicate fluid-tight seals therebetween.

Figure 2:
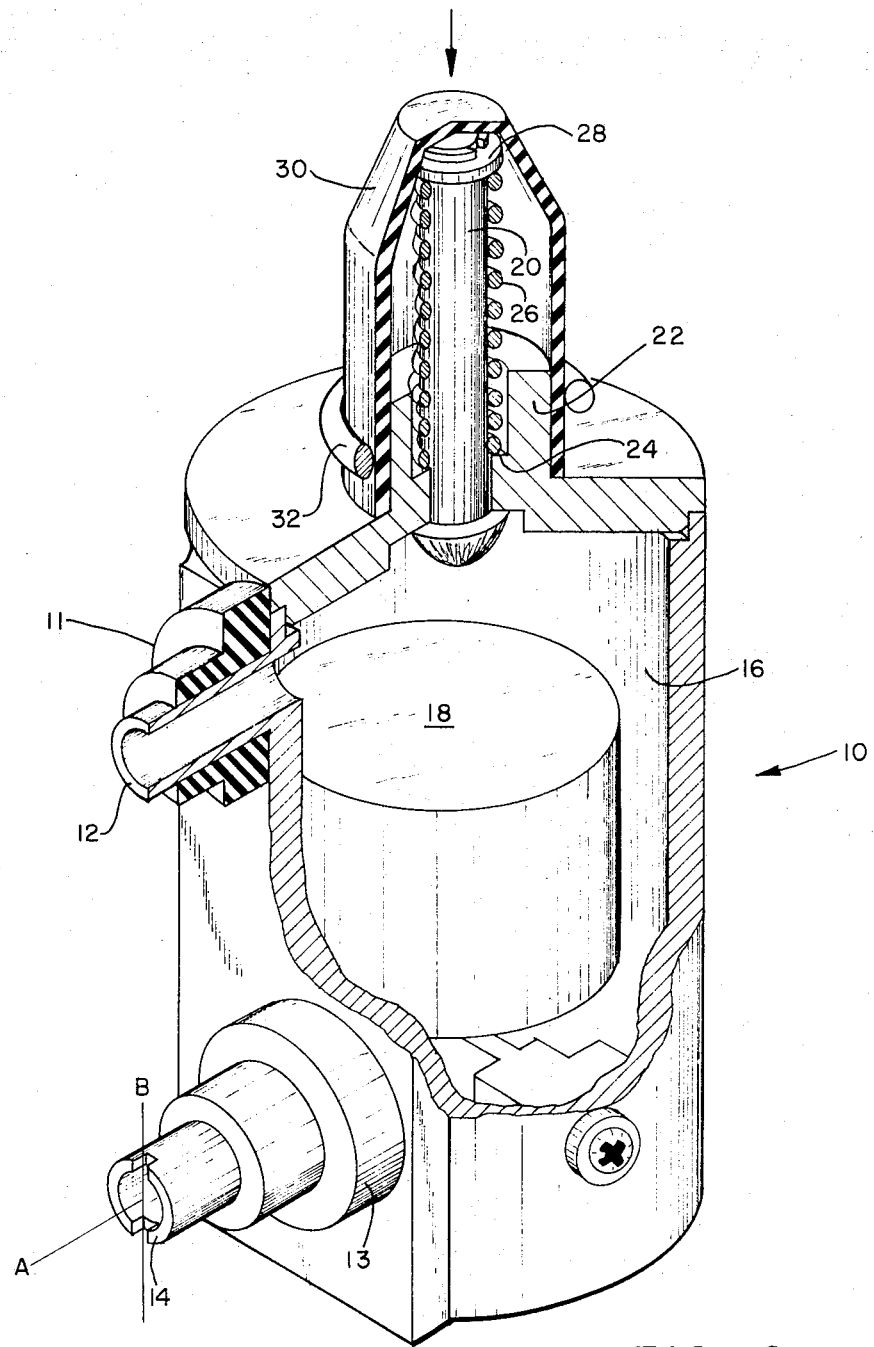
FIG. 2 is an isometric partially broken away view of my invention.

FIG. 2 shows in greater detail the indicator 10. The inner walls of the indicator define a float chamber 16 having an upper port 12 and a lower damping port 14 within which chamber is disposed a cylindrical-type float 18. The upper portion of the housing is adapted to receive a plunger 20 which reciprocates in an annular sleeve 22. The annular sleeve has an annular shoulder 24 wherein it is adapted to receive one end of a spring 26. A flange 28 is disposed on the upper end of the plunger and is adapted to receive the other end of the spring 26. Disposed over the plunger-spring-sleeve portion of the monitor is a flexible housing 30 which is secured to the monitor 10 by an annular ring 32.

Figure 3:
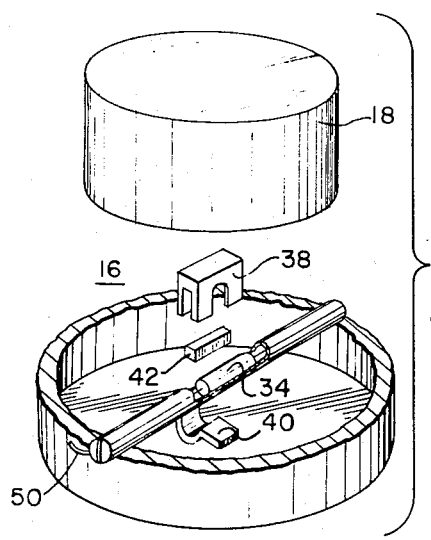
FIG. 3 is a bottom sectional view of my invention and a partial exploded view of the guide elements.

Referring to FIG. 3, the monitor 10 is shown in greater detail wherein a reed switch 34 passes through the chamber 16 in a sealed tube 36. To control the horizontal and rotative movement of the float 18 in the chamber 16, guides 38 and 40 are secured to the bottom of the float and about the tube 36 as shown. A magnet 42 is received within the extending arm of the guide 38 and in parallel relationship with the reed switch 34.

The tube 36 which passes through the lower portion of the chamber and into and through the side walls of the housing is engaged to the walls of the housing in a fluid-tight manner such as by brazing or welding. Disposed within the tube is the reed switch 34 responsive to the magnetic field of the magnet 42. Preferably, one end of the tube within which the reed switch is disposed is sealed and the reed switch grounded therein. The other end of the tube remains open to the atmosphere and the other lead end of the switch passes therethrough. An insulated lead wire 50 from the tube may then communicate with any type of circuitry for indicating their liquid level as desired. Referring again to FIG. 1, a schematic or circuit for a low power indicator is illustrated wherein the current switched by the magnet actuating the reed switch flows through the indicator 52 which is in communication with the fuse 54 which in turn is in electrical communication with the 12-volt power supply of the vehicle. Alternatively, if a high power indicator is required, then referring again to FIG. 1, current will pass through transistor 60 and then to the indicator 62 as shown. If desired, a relay may be employed in lieu of the transistor 60.

In the normal operation of the invention, such as when it is employed with a closed pressurized vessel, such as a radiator, when the fluid level in the radiator reaches or falls to a predetermined level, the float 18 in the chamber will rise or fall corresponding to the liquid level in the radiator. As the level of fluid in the radiator decreases, either through leakage or evaporation, the float will move downwardly guided in its position by guides 38 and 40. As the magnet 42, such as a Hamlin Inc. switch-type H-31-604, approaches the reed switch 34, the magnetic field received by the reed switch increases; and when it reaches a predetermined level, such as about 30 gauss, the reed switch is actuated wherein a current of about 110 milliamps flows to the indicator 52 actuating the indicator. Of course, the strength of the magnetic field and the current from the reed switch will vary depending upon the material and components used. As described, for this embodiment the float will just about be resting on the outer surface of the tube 36 when the switch is actuated. This visual indication may be observed and steps taken to correct the level of fluid in the radiator.

In the absence of any warning indication from the fluid level indicator, it can mean that there is sufficient coolant in the radiator or that there is a malfunction somewhere in the monitoring system, either in the reed switch, or position of the float, i.e., it may be inhibited from floating freely, the circuits leading to the indicator, or the indicator. In the event that the failure of the light to reflect properly the level of coolant because of a malfunction in the system, then the indicator 10 as a unit provides less information about the coolant system condition and may even defeat its intended purpose by attributing to engine failure if the operator has confidence in a faulty unit.

To overcome these problems and to ensure proper operation of the monitoring system, the plunger 20 which is normally biased upwardly away from the top of the float 18 by the spring 26 may be depressed whereby the plunger contacts the top of the float and moves the float downwardly with the result that regardless of the actual level of fluid in the chamber the magnet may be brought into contact with the reed switch to actuate the reed switch. Accordingly, when the plunger is depressed, if there is no response on the indicator, then this indicates that there is a malfunction in the system which should be corrected. A further feature of pressing the plunger is that it creates a small transient flow through the damping port 14 which serves to purge the damping port of any particles which may have accumulated there.

The damping port 14 prevents or inhibits agitation of fluid in the chamber because of its construction, that is, essentially it is a bottomless vertical slit; there is no lower edge or lip to favor the accumulation of sediment which may be generated or flow from the vessel, the fluid of which is being monitored. There is an opportunity for flow of fluid both through the port axis A and the long port axis B to dislodge any accumulated particles. This particular configuration takes into consideration the presence of foreign material, particles, and sludge with such a cooling system as described in the preferred embodiment and the possibility that they may clog any small ports or orifices used to provide damping. Further, the damping port 14 is disposed such that it extends into the vessel so that it would benefit from the scrubbing action of any turbulent flow there and it is located external to the float chamber so as not to be occluded by any accumulation of sediment on the bottom of the float chamber.

My invention has been described with particular reference to a particular cylindrical float in a float chamber having vertical and horizontal guides such as described in U.S. Ser. No. 96,765, FLUID LEVEL MONITORING SYSTEM, filed Dec. 10, 1970, (now U.S. Pat No. 3,715,539, issued Feb. 6, 1973) owned by a common Assignee, which application is hereby incorporated in this application in its entirety. However, my invention may be successfully employed in any fluid level monitoring system wherein a float in a float chamber is responsive to the level of fluid in a vessel which is being monitored, such as exemplified by the aforementioned prior art patents; and the vertical and horizontal guides, the magnet disposed externally on the float, and the internal positioning of the reed switch in the float chamber, although preferred, are not necessary for the successful employment of my invention.

Any structure may be employed to depress the float, such as an arm extending horizontally into the chamber and pivoting about an axis such as on the chamber wall similar to the operation of a lever or pump handle. The upper port 12, which allows air bubbles or excess fluid which may enter the chamber 16 to exit through the conduit and back into the radiator, may assume other configurations, and to further enhance the damping effect of the indicator, may assume a configuration similar to that of the lower port.

Figure 4:
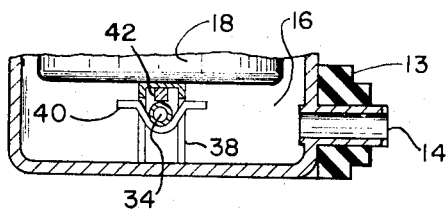
FIG. 4 is a further isometric partially broken away view of my invention.

The indicator 10 as shown is secured to the radiator 2 in such a manner that the reed switch is disposed slightly below the minimum level at which the indicator is to be actuated. When the fluid in the radiator is at its normal level, the float 18 will rise to a higher position in which position the float guide 38 is such that the ends are still about the outer wall of the tube 36 whereby the float remains in alignment. Further, the vertical guide 40 still engages the tines on the float guide when the float is in its uppermost position. This ensures that the magnet secured to the bottom of the float is always in substantially parallel relationship with the reed switch as shown in FIG. 4.

In an alternative embodiment, the reed switch could be placed in the upper portion of the chamber, the magnet disposed on the top of the float. Under normal conditions the switch would be engaged. When the fluid level fell, the switch would disengage. In this embodiment, depending upon how wired the magnet, actuating the switch in the normal upper portion could or could not give a signal.

Although the invention has been described in particular reference to the employment of a magnetic reed switch in combination with a magnet to provide an off-on indication, a variable indicator or switch responsive to an increasing magnetic field may be employed, such as a Hall effect device. In this manner the changes in signal could be evaluated over an entire range and could be read out on an electrometer or an operational amplifier calibrated in the reading desired. In this embodiment, the degree of fluid level being monitored could be measured in degrees over a range.

Another embodiment when employing the off-on concept of the magnetic reed switch would be to have a series of switches responsive to the movement of the magnet whereby off-on indications could be given for various levels such as high, normal, and low. For example, three or more reed switches could be disposed on the side of the housing either within or without the chamber. A single magnet could be employed which magnet would be adapted to pass through the entire distance defined by the first and last reed switches. The magnet could be secured to the side of the float and when in its uppermost position actuate a first switch through circuitry similar to that as shown and indicating a full or high position. As the fluid level in the radiator and the float dropped corresponding thereto, a second reed switch on the wall spaced apart and downwardly from the first would be actuated to indicate a normal level. If the fluid level in the indicator continued to drop, then the float would correspondingly continue to drop and could actuate a third reed switch spaced apart and downwardly from the second whereby the third reed switch would be actuated to give an off-on indication, such as to indicate a low or undesirable level.

Although described in combination with a permanent magnet and a reed switch responsive to the magnetic field thereof, other self-contained sources of energy or magnetic energy may be used. For example, in a large installation it may be desirable, rather than to use a permanent magnet, to use an electromagnet having a self-contained power system. Also, other sources of self-contained energy may be used. The preferred embodiment has been described in reference to the utilization of a reed switch responsive to the magnetic field of the permanent magnet. Other devices which may be used in lieu thereof would include other magnetic circuits, as are well known, which are responsive to magnetic fields. The permanent magnet may be any convenient shape or size and if elongated in shape may be perpendicular to or at any angle to the bottom surface of the float.

Although described for measuring the fluid level in a radiator, the invention also finds employment in measuring the fluid level in any container such as a pressurized, closed container, one in which although not pressurized or closed may be such that the fluid is difficult to measure because of inaccessability, or for any fluid measuring system as desired. For example, it may be used to indicate liquid levels in a sump pump, etc. .

Having described my invention, what I now claim is:

1. In a fluid level indicator for monitoring the fluid level in a vessel wherein a housing is secured to the vessel, the housing having inlet and outlet ports and a float chamber, the ports providing fluid-flow communication between the float chamber and the vessel, a float disposed in the float chamber for movement therein, a magnet secured to the float for movement therewith, a switch means disposed within the housing and adapted to be actuated by the magnet, and a signal monitoring means responsive to the actuation of the switch means when the fluid level in the vessel reaches a preselected level, the improvement which comprises:
a plunger adapted for reciprocating action between a bias position and an actuating position, the plunger positioned in the upper portion of the housing, the plunger having a one end and another end, the plunger spring-biased upwardly in the bias position, with the one end of the plunger extending above the surface of the housing, and the other end above, but free of contact with the top surface of the float in the float chamber, and the plunger in an actuating position having the other end of the plunger in contact with the top surface of the float, with the float positioned to actuate the switch means, whereby on moving the plunger from the bias to the actuating position, the float and magnet move independently of the level of the fluid in the float chamber to validate the signal monitoring means.

2. The indicator of claim 1 which includes a flexible housing secured over the one end of the plunger and to the housing.

3. The indicator of claim 1 wherein the switch means composes a reed switch, the magnet is a permanent magnet secured to the bottom of the float, and which indicator includes guide means to place the magnet in a close generally parallel actuating position to the reed switch in the actuating position.

4. The indicator of claim 1 wherein the outlet port is located in the upper portion of the housing, and which port permits venting between the vessel and the float chamber, and the inlet port is located in the lower portion of the housing, and provides direct fluid-flow communication between the fluid in the vessel and the fluid in the float chamber.

5. The device of claim 4 wherein the inlet port is characterized by an elongated slit therein.

6. The indicator of claim 5 wherein the elongated slit extends vertically from one to the other end of the inlet port in reference to the fluid level in the float chamber.

7. A closed pressurized fluid-containing vessel, such as a radiator, which contains a fluid whose level is to be monitored, which vessel includes in combination therewith: the indicator of claim 1 with the inlet and outlet ports of the indicator in fluid-flow communication between the vessel and the float chamber of the indicator.

8. A fluid level indicator adapted to monitor the fluid level in a radiator, which indicator comprises in combination:
 a. housing adapted to be secured to the radiator, the housing defining a generally cylindrical float chamber, the housing having an outlet port located in the upper portion of the housing, which port permits venting between the radiator and the float chamber, and an inlet damping port located in the lower portion of the housing, which inlet port provides direct fluid-flow communication between the fluid in the vessel and the fluid in the float chamber;
 b. a float disposed in the flow chamber and adapted for vertical movement in the chamber with the movement of the fluid level in the chamber;
 c. a permanent magnet secured to the bottom surface of the float and adapted for movement with the float;
 d. a reed switch disposed in the lower portion of the housing, and adapted to be actuated by the magnet on the float when the float moves downwardly into an actuating position;
 e. a signal monitoring means responsive to the actuation of the reed switch by the float when the fluid level falls below a preselected level;
 f. a plunger adapted for reciprocating action between a bias position and an actuating position, the plunger positioned in and extending through the upper surface of the housing, the plunger having a one end and another end, the plunger spring-biased upwardly in the bias position, with the one end of the plunger extending above the outer surface of the housing, and the other end above, but free of contact with, the top surface of the float in the float chamber, and the plunger in an actuating position, having the other end of the plunger in contact with the top surface of the float, and the float placed in a position so as to permit the magnet to activate the reed switch;
 g. a flexible housing secured over the one end of the plunger and to the upper portion of the housing; and
 h. a guide means to guide the float during its movement in the float chamber, and to place the permanent magnet in an actuating position to the reed switch, whereby on depressing the plunger to the activating position, the float moves downwardly independently of the level of the fluid in the flow chamber to validate the single monitoring means.

9. The indicator of claim 8 wherein the inlet port is characterized by an elongated vertically disposed slit extending from one to the other edge of the inlet port, the slit vertical in reference to the fluid level in the flow chamber, and the inlet port adapted to extend into the radiator whose fluid level is to be monitored.

* * * * *